US012650984B2

(12) United States Patent
Singh et al.

(10) Patent No.: US 12,650,984 B2
(45) Date of Patent: Jun. 9, 2026

(54) SYSTEMS, APPARATUSES, METHODS, AND COMPUTER PROGRAM PRODUCTS FOR OPTIMIZING SEARCH LATENCY

(71) Applicant: HONEYWELL INTERNATIONAL INC., Charlotte, NC (US)

(72) Inventors: Ankit Singh, Apex, NC (US); Lakshminarayana Paila, Knoxville, TN (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 4 days.

(21) Appl. No.: 18/308,153

(22) Filed: Apr. 27, 2023

(65) Prior Publication Data

US 2024/0362221 A1     Oct. 31, 2024

(51) Int. Cl.
*G06F 16/2453*     (2019.01)
*G06F 16/2455*     (2019.01)

(52) U.S. Cl.
CPC .... *G06F 16/24542* (2019.01); *G06F 16/2455* (2019.01)

(58) Field of Classification Search
None
See application file for complete search history.

(56) References Cited

U.S. PATENT DOCUMENTS

| | | | | |
|---|---|---|---|---|
| 8,893,131 B2 * | 11/2014 | Ramakrishnan | ...... | G06F 9/5083 |
| | | | | 709/201 |
| 8,935,257 B1 * | 1/2015 | Vemuri | ............... | G06F 16/2386 |
| | | | | 707/741 |

| | | | | |
|---|---|---|---|---|
| 2008/0310514 A1 * | 12/2008 | Osamoto | .............. | H04N 19/109 |
| | | | | 375/E7.123 |
| 2014/0108587 A1 * | 4/2014 | Goldberg | ............ | G06F 16/1827 |
| | | | | 709/215 |
| 2015/0169685 A1 * | 6/2015 | Elias | ..................... | H04L 47/125 |
| | | | | 707/718 |
| 2016/0171047 A1 * | 6/2016 | Beisiegel | ............ | G06F 16/2453 |
| | | | | 707/715 |
| 2017/0032064 A1 * | 2/2017 | Walsh | ................... | G06F 9/5061 |
| 2017/0308809 A1 * | 10/2017 | Mozes | .................. | G06F 16/212 |
| 2021/0349648 A1 * | 11/2021 | Fatemieh | .......... | G06F 16/24554 |
| 2022/0284004 A1 * | 9/2022 | Okutubo | ............. | G06F 16/2282 |
| 2022/0358129 A1 * | 11/2022 | Patni | ................. | G06F 16/24539 |
| 2022/0391411 A1 * | 12/2022 | Grimaldi | ............. | G06F 11/3409 |

(Continued)

*Primary Examiner* — Christopher J Raab

(74) *Attorney, Agent, or Firm* — ALSTON & BIRD LLP

(57)     ABSTRACT

Systems, apparatuses, methods, and computer program products are provided. For example, a computer-implemented method may include receiving one or more datasets from a user. In some embodiments, computer-implemented method may include storing at least a portion of the one or more datasets in a first shard during a first time period. In some embodiments, the first shard comprises shard data. In some embodiments, the shard data is associated with a data size. In some embodiments, computer-implemented method may include determining that the data size of the shard data in the first shard is greater than a first data size threshold. In some embodiments, computer-implemented method may include in response to the determination that the data size of the shard data in the first shard is greater than the first data size threshold, transferring at least a portion of the shard data in the first shard to a second shard.

20 Claims, 5 Drawing Sheets

(56) References Cited

U.S. PATENT DOCUMENTS

| 2023/0021868 A1* | 1/2023 | Bierner | ................. G06F 16/951 |
| 2023/0105249 A1* | 4/2023 | Mohamed | ........... G06F 16/2228 |
| 2023/0120862 A1* | 4/2023 | Gao | ...................... G06F 3/0679 |
| | | | 711/154 |
| 2023/0229659 A1* | 7/2023 | Beresniewicz | ..... G06F 11/3419 |
| | | | 707/718 |

* cited by examiner

100

SYSTEMS, APPARATUSES, METHODS, AND COMPUTER PROGRAM PRODUCTS FOR OPTIMIZING SEARCH LATENCY

TECHNOLOGICAL FIELD

Embodiments of the present disclosure relate generally to optimizing search latency.

BACKGROUND

Applicant has identified many technical challenges and difficulties associated with optimizing search latency. Through applied effort, ingenuity, and innovation, Applicant has solved problems related to optimizing search latency by developing solutions embodied in the present disclosure, which are described in detail below.

BRIEF SUMMARY

Various embodiments described herein relate to optimizing search latency.

In accordance with one aspect of the disclosure, a computer-implemented method is provided. In some embodiments, the computer-implemented method may include receiving one or more datasets from a user. In some embodiments, the computer-implemented method may include storing at least a portion of the one or more datasets in a first shard during a first time period. In some embodiments, the first shard includes shard data. In some embodiments, the shard data is associated with a data size. In some embodiments, the computer-implemented method may include determining that the data size of the shard data in the first shard is greater than a first data size threshold. In some embodiments, the computer-implemented method may include, in response to the determination that the data size of the shard data in the first shard is greater than the first data size threshold, transferring at least a portion of the shard data in the first shard to a second shard.

In some embodiments, transferring at least a portion of the shard data in the first shard to the second shard occurs during a third time period.

In some embodiments, the third time period is based at least in part on historical activity data associated with the user.

In some embodiments, the historical activity data indicates that the user is inactive during the third time period.

In some embodiments, the computer-implemented method may include receiving a first query from the user to access at least a portion of the shard data during a second time period.

In some embodiments, the first query is associated with a first latency.

In some embodiments, the computer-implemented method may include receiving a second query from the user to access at least a portion of the shard data during a fourth time period.

In some embodiments, the second query is associated with a second latency.

In some embodiments, the first latency is greater than the second latency.

In some embodiments, the shard data comprises at least a portion of the one or more datasets.

In some embodiments, the first shard is associated with a first database and the second shard is associated with a second database.

In some embodiments, the first shard has a first data storage size.

In some embodiments, the first data storage size is greater than the first data size threshold.

In some embodiments, the computer-implemented method may include determining that a second data size of second shard data in a third shard is less than a second data size threshold.

In some embodiments, the computer-implemented method may include in response to the determination that the second data size of the second shard data in the third shard is less than the second data size threshold, transferring at least a portion of the second shard data in the third shard to a fourth shard.

In accordance with another aspect of the disclosure, an apparatus is provided. In some embodiments, the apparatus may include at least one processor and at least one memory coupled to the at least one processor. In some embodiments, the at least one processor is configured to receive one or more datasets from a user. In some embodiments, the at least one processor is configured to store at least a portion of the one or more datasets in a first shard during a first time period. In some embodiments, the first shard includes shard data. In some embodiments, the shard data is associated with a data size. In some embodiments, the at least one processor is configured to determine that the data size of the shard data in the first shard is greater than a first data size threshold. In some embodiments, the at least one processor is configured to, in response to the determination that the data size of the shard data in the first shard is greater than the first data size threshold, transfer at least a portion of the shard data in the first shard to a second shard.

In some embodiments, transferring at least a portion of the shard data in the first shard to the second shard occurs during a third time period.

In some embodiments, the third time period is based at least in part on historical activity data associated with the user.

In some embodiments, the historical activity data indicates that the user is inactive during the third time period.

In some embodiments, the at least one processor is configured to receive a first query from the user to access at least a portion of the shard data during a second time period.

In some embodiments, the first query is associated with a first latency.

In some embodiments, the at least one processor is configured to receive a second query from the user to access at least a portion of the shard data during a fourth time period.

In some embodiments, the second query is associated with a second latency.

In some embodiments, the first latency is greater than the second latency.

In some embodiments, the shard data comprises at least a portion of the one or more datasets.

In some embodiments, the first shard is associated with a first database and the second shard is associated with a second database.

In some embodiments, the first shard has a first data storage size.

In some embodiments, the first data storage size is greater than the first data size threshold.

In some embodiments, the at least one processor is configured to determine that a second data size of second shard data in a third shard is less than a second data size threshold.

In some embodiments, the at least one processor is configured to, in response to the determination that the second data size of the second shard data in the third shard is less than the second data size threshold, transfer at least a portion of the second shard data in the third shard to a fourth shard.

In accordance with another aspect of the disclosure, a non-transitory computer-readable storage medium is provided. In some embodiments, the non-transitory computer-readable storage medium may include computer program code for execution by one or more processors of a device. In some embodiments, the computer program code is configured to, when executed by the one or more processors, cause the device to receive one or more datasets from a user. In some embodiments, the computer program code is configured to, when executed by the one or more processors, cause the device to store at least a portion of the one or more datasets in a first shard during a first time period. In some embodiments, the first shard includes shard data. In some embodiments, the shard data is associated with a data size. In some embodiments, the computer program code is configured to, when executed by the one or more processors, cause the device to determine that the data size of the shard data in the first shard is greater than a first data size threshold. In some embodiments, the computer program code is configured to, when executed by the one or more processors, cause the device to, in response to the determination that the data size of the shard data in the first shard is greater than the first data size threshold, transfer at least a portion of the shard data in the first shard to a second shard.

In some embodiments, transferring at least a portion of the shard data in the first shard to the second shard occurs during a third time period.

In some embodiments, the third time period is based at least in part on historical activity data associated with the user.

In some embodiments, the historical activity data indicates that the user is inactive during the third time period.

In some embodiments, the computer program code is configured to, when executed by the one or more processors, cause the device to receive a first query from the user to access at least a portion of the shard data during a second time period.

In some embodiments, the first query is associated with a first latency.

In some embodiments, the computer program code is configured to, when executed by the one or more processors, cause the device to receive a second query from the user to access at least a portion of the shard data during a fourth time period.

In some embodiments, the second query is associated with a second latency.

In some embodiments, the first latency is greater than the second latency.

In some embodiments, the shard data comprises at least a portion of the one or more datasets.

In some embodiments, the first shard is associated with a first database and the second shard is associated with a second database.

In some embodiments, the first shard has a first data storage size.

In some embodiments, the first data storage size is greater than the first data size threshold.

In some embodiments, the computer program code is configured to, when executed by the one or more processors, cause the device to determine that a second data size of second shard data in a third shard is less than a second data size threshold.

In some embodiments, the computer program code is configured to, when executed by the one or more processors, cause the device to, in response to the determination that the second data size of the second shard data in the third shard is less than the second data size threshold, transfer at least a portion of the second shard data in the third shard to a fourth shard.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

DETAILED DESCRIPTION

Figure 1:
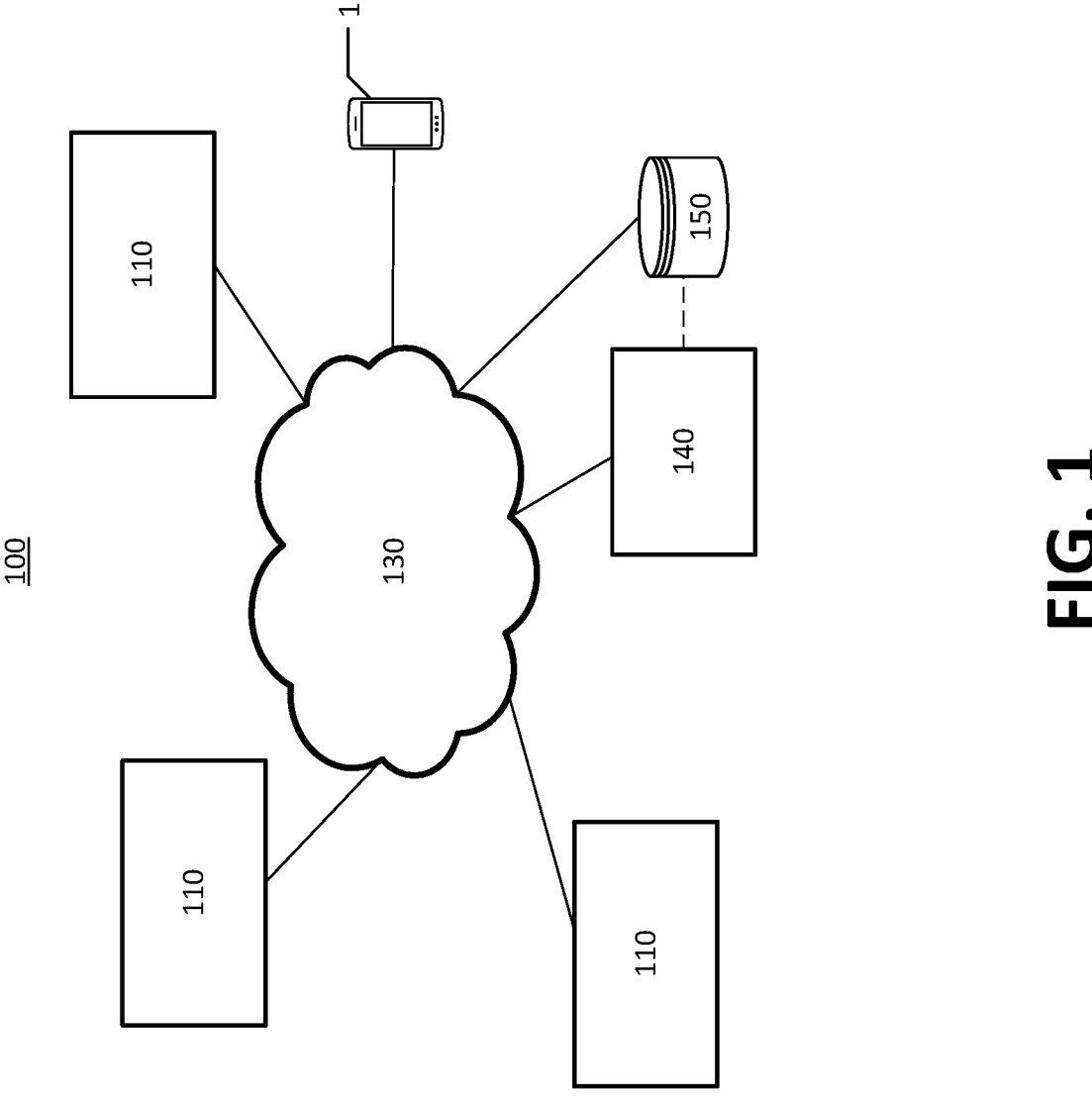
FIG. 1 illustrates an exemplary block diagram of an environment in which embodiments of the present disclosure may operate.

Example embodiments will be described more fully hereinafter with reference to the accompanying drawings, in which some, but not all embodiments of disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Overview

Example embodiments disclosed herein address technical problems associated with optimizing search latency. As would be understood by one skilled in the field to which this disclosure pertains, there are numerous example scenarios in which optimizing search latency is desirable.

In many applications, it is necessary to store data in one or more databases, such that the data may be queried and, in response to a query, search results may be returned having data relevant to the query. For example, it may be necessary to store data about documents associated with a document management system in one or more databases such that the documents may be queried. In some such applications, the one or more databases may include a sharded database in which the data may be stored in one or more of a plurality of shards.

Example solutions for storing data in one or more sharded databases include, for example, a system configured to receive data, store the data in a first shard of the plurality of shards until the first shard is full, and successively store data in each of the plurality of shards until each shard in the plurality of shards is full (e.g., a data size associated with data stored in each shard is equal to a data storage size of each shard) and/or all of the data has been stored in one or more of the plurality of shards. However, such an example solution for storing data in one or more sharded databases is associated with high latency in response to queries of the data (e.g., it takes a large amount of time to return search results having data relevant to the query) because it takes the system longer to return search results to a query when the data size of the data in a shard is large and/or when the data size of the data in a shard is close to the data storage size of the shard (e.g., when the shard is greater than 50% full).

Thus, to address these and/or other issues related to optimizing search latency, example systems, apparatuses, computer program products, and/or methods are disclosed herein. For example, in an embodiment in this disclosure, described in greater detail below, a computer-implemented method may include receiving one or more datasets from a user. In some embodiments, the computer-implemented method may include storing at least a portion of the one or more datasets in a first shard during a first time period. In some embodiments, the first shard comprises shard data. In some embodiments, the shard data is associated with a data size. In some embodiments, the computer-implemented method may include determining that the data size of the shard data in the first shard is greater than a first data size threshold. In some embodiments, in response to the determination that the data size of the shard data in the first shard is greater than the first data size threshold, transferring at least a portion of the shard data in the first shard to a second shard. Accordingly, the systems, apparatuses, methods, and computer program products disclosed herein are able to optimize searching latency by monitoring the amount of shard data stored in each of a plurality of shards and transferring shard data to another shard when the data size of shard data in one shard is greater than a data size threshold to reduce latency associated with queries of shard data stored in one of the plurality of shards.

Example Apparatuses and Systems

Embodiments of the present disclosure herein include systems, apparatuses, methods, and computer program products related to optimizing search latency. It should be readily appreciated that the embodiments of the apparatus, systems, methods, and computer program product described herein may be configured in various additional and alternative manners in addition to those expressly described herein.

FIG. 1 illustrates an exemplary block diagram of an environment 100 in which embodiments of the present disclosure may operate. Specifically, FIG. 1 illustrates a plurality of computing devices 110. In some embodiments, each of the plurality of computing devices 110 may be associated with a user. In some embodiments a user may be an owner and/or operator of an associated computing device. In some embodiments, each computing device of the plurality of computing devices 110 is configured via hardware, software, firmware, and/or a combination thereof, to perform data intake of one or more types of data associated with an associated user. Additionally or alternatively still, in some embodiments, each computing device of the plurality of computing devices 110 is configured via hardware, software, firmware, and/or a combination thereof, to perform data reporting and/or other data output process(es) associated with one or more documents associated with an associated user. In some embodiments, each computing device of the plurality of computing devices 110 may comprise a document management system.

In some embodiments, each of the plurality of computing devices 110 is associated with a determinable location. The determinable location of each of the plurality of computing devices 110 in some embodiments represents an absolute position (e.g., GPS coordinates, latitude, and longitude locations, and/or the like) or a relative position (e.g., an identifier representing the of each of the plurality of computing devices 110 from a local origin point).

The network 130 may be embodied in any of a myriad of network configurations. In some embodiments, the network 130 may be a public network (e.g., the Internet). In some embodiments, the network 130 may be a private network (e.g., an internal localized, or closed-off network between particular devices). In some other embodiments, the network 130 may be a hybrid network (e.g., a network enabling internal communications between particular connected devices and external communications with other devices). In various embodiments, the network 130 may include one or more base station(s), relay(s), router(s), switch(es), cell tower(s), communications cable(s), routing station(s), and/or the like. In various embodiments, components of the environment 100 may be communicatively coupled to transmit data to and/or receive data from one another over the network 130. Such configuration(s) include, without limitation, a wired or wireless Personal Area Network (PAN), Local Area Network (LAN), Metropolitan Area Network (MAN), Wide Area Network (WAN), and/or the like.

In some embodiments, the environment 100 may include a searching optimization system 140. The searching optimization system 140 may be electronically and/or communicatively coupled to the plurality of computing devices 110, the one or more user devices 160, and/or the one or more databases 150. The searching optimization system 140 may be located remotely, in proximity of, and/or within a particular computing device of the plurality of computing devices 110. In some embodiments, the searching optimization system 140 is configured via hardware, software, firmware, and/or a combination thereof, to perform data intake of one or more types of data associated with one or more of the plurality of computing devices 110. Additionally or alternatively, in some embodiments, the searching optimization system 140 is configured via hardware, software, firmware, and/or a combination thereof, to generate and/or transmit command(s) that control, adjust, or otherwise impact operations of one or more of, the one or more databases 150 and/or the plurality of computing devices 110. Additionally or alternatively still, in some embodiments, the searching optimization system 140 is configured via hardware, software, firmware, and/or a combination thereof, to perform data reporting and/or other data output process(es) associated with monitoring or otherwise analyzing operations of one or more of the one or more databases 150 and/or the plurality of computing devices 110, for example for generating and/or outputting report(s) corresponding to the operations performed via the plurality of computing devices 110. For example, in various embodiments, the searching optimization system 140 may be configured to execute and/or perform one or more operations and/or functions described herein.

The one or more databases 150 may be configured to receive, store, and/or transmit data. In some embodiments, the one or more databases 150 may be associated with one or more datasets associated with the plurality of computing devices 110. In some embodiments, the one or more databases 150 may be associated with datasets received by the searching optimization system 140 in real-time. Additionally or alternatively, the one or more databases 150 may be associated with datasets received by the searching optimization system 140 on a periodic basis (e.g., the datasets may be received by the searching optimization system 140 once per day). Additionally or alternatively, the one or more databases 150 may be associated with datasets received by the searching optimization system 140 after the searching optimization system 140 has requested the datasets. Additionally or alternatively, the one or more databases 150 may be associated with datasets based on an input (e.g., a user input) into the searching optimization system 140 and/or the one or more user devices 160. In some embodiments, the one or more databases 150 may be sharded databases.

The one or more user devices 160 may be associated with users of searching optimization system 140. In various embodiments, the searching optimization system 140 may generate and/or transmit a message, alert, or indication to a user via one or more user devices 160. Additionally, or alternatively, the one or more user devices 160 may be utilized by a user to remotely access a searching optimization system 140. This may be by, for example, an application operating on the one or more user devices 160. A user may access the searching optimization system 140 remotely, including one or more visualizations, reports, and/or real-time displays.

Additionally, while FIG. 1 illustrates certain components as separate, standalone entities communicating over the network 130, various embodiments are not limited to this configuration. In other embodiments, one or more components may be directly connected and/or share hardware or the like. For example, in some embodiments, the searching optimization system 140 may include one or more databases 150, which may collectively be located in or at the plurality of computing devices 110.

Figure 2:
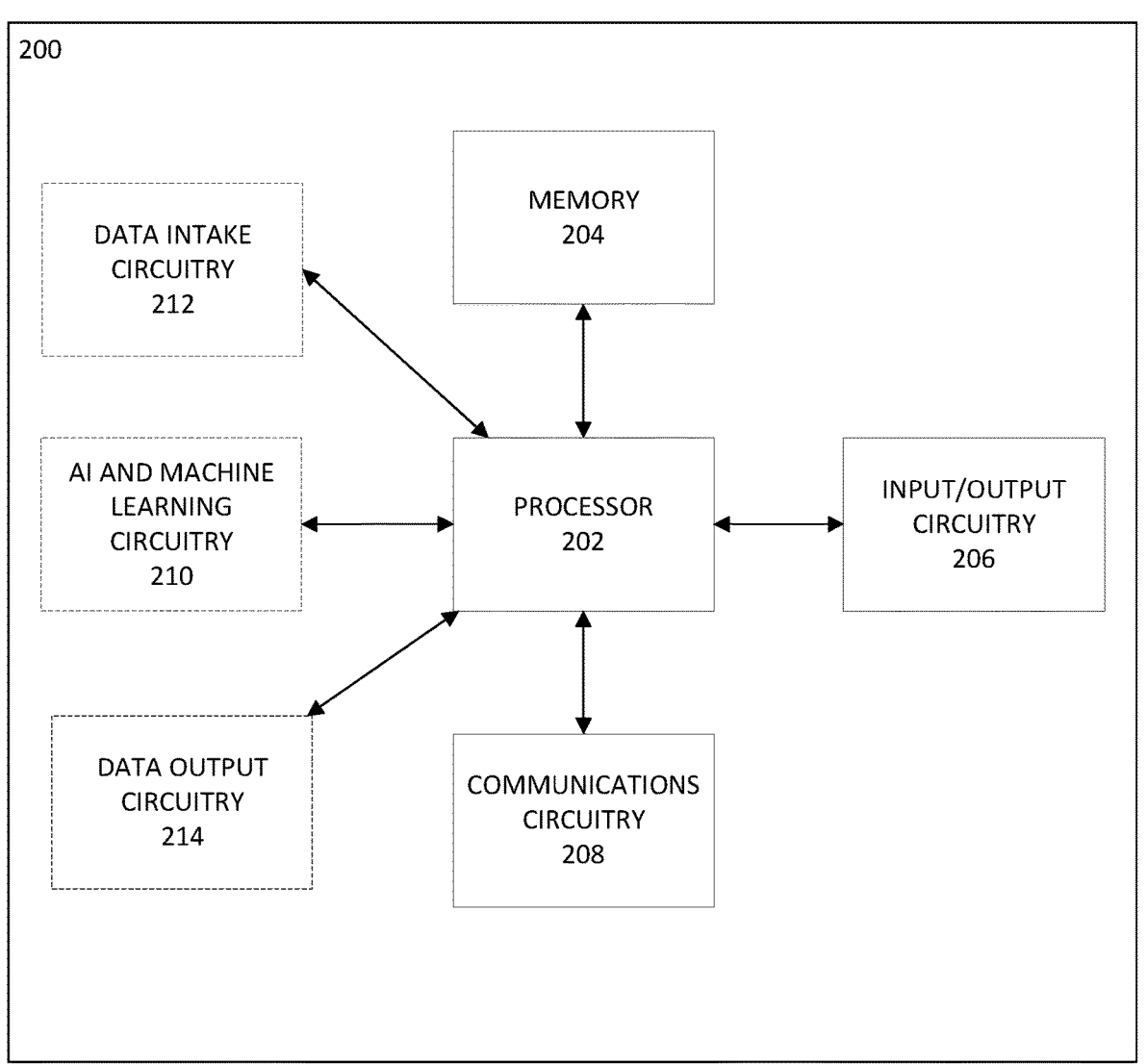
FIG. 2 illustrates an exemplary block diagram of an example apparatus that may be specially configured in accordance with one or more embodiments of the present disclosure.

FIG. 2 illustrates an exemplary block diagram of an example apparatus that may be specially configured in accordance with an example embodiment of the present disclosure. Specifically, FIG. 2 depicts an example computing apparatus 200 ("apparatus 200") specially configured in accordance with at least some example embodiments of the present disclosure. For example, the computing apparatus 200 may be embodied as one or more of a specifically configured personal computing apparatus, a specifically configured cloud based computing apparatus, and/or the like. Examples of an apparatus 200 may include, but is not limited to, the searching optimization system 140, the plurality of computing devices 110, the one or more user devices 160, and/or the one or more databases 150. The apparatus 200 includes processor 202, memory 204, input/output circuitry 206, communications circuitry 208, and/or optional artificial intelligence ("AI") and machine learning circuitry 210. In some embodiments, the apparatus 200 is configured to execute and perform the operations described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), memory(ies), circuitry(ies), and/or the like to perform their associated functions such that duplicate hardware is not required for each set of circuitry.

In various embodiments, such as computing apparatus 200 of a searching optimization system 140, the plurality of computing devices 110, and/or the one or more user devices 160 may refer to, for example, one or more computers, computing entities, desktop computers, mobile phones, tablets, phablets, notebooks, laptops, distributed systems, servers, or the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein. In one embodiment, these functions, operations, and/or processes can be performed on data, content, information, and/or similar terms used herein. In this regard, the apparatus 200 embodies a particular, specially configured computing entity transformed to enable the specific operations described herein and provide the specific advantages associated therewith, as described herein.

Processor 202 or processor circuitry 202 may be embodied in a number of different ways. In various embodiments, the use of the terms "processor" should be understood to include a single core processor, a multi-core processor, multiple processors internal to the apparatus 200, and/or one or more remote or "cloud" processor(s) external to the apparatus 200. In some example embodiments, processor 202 may include one or more processing devices configured to perform independently. Alternatively, or additionally, processor 202 may include one or more processor(s) configured in tandem via a bus to enable independent execution of operations, instructions, pipelining, and/or multithreading.

In an example embodiment, the processor 202 may be configured to execute instructions stored in the memory 204 or otherwise accessible to the processor. Alternatively, or additionally, the processor 202 may be configured to execute hard-coded functionality. As such, whether configured by hardware or software methods, or by a combination thereof, processor 202 may represent an entity (e.g., physically embodied in circuitry) capable of performing operations according to embodiments of the present disclosure while configured accordingly. Alternatively, or additionally, processor 202 may be embodied as an executor of software instructions, and the instructions may specifically configure the processor 202 to perform the various algorithms embodied in one or more operations described herein when such instructions are executed. In some embodiments, the processor 202 includes hardware, software, firmware, and/or a combination thereof that performs one or more operations described herein.

In some embodiments, the processor 202 (and/or co-processor or any other processing circuitry assisting or otherwise associated with the processor) is/are in communication with the memory 204 via a bus for passing information among components of the apparatus 200.

Memory 204 or memory circuitry 204 may be non-transitory and may include, for example, one or more volatile and/or non-volatile memories. In some embodiments, the memory 204 includes or embodies an electronic storage device (e.g., a computer readable storage medium). In some embodiments, the memory 204 is configured to store information, data, content, applications, instructions, or the like, for enabling an apparatus 200 to carry out various operations and/or functions in accordance with example embodiments of the present disclosure.

Input/output circuitry 206 may be included in the apparatus 200. In some embodiments, input/output circuitry 206 may provide output to the user and/or receive input from a user. The input/output circuitry 206 may be in communication with the processor 202 to provide such functionality. The input/output circuitry 206 may comprise one or more user interface(s). In some embodiments, a user interface may include a display that comprises the interface(s) rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms. The processor 202 and/or input/output circuitry 206 comprising the processor may be configured to control one or more operations and/or functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a display associated with a user.

Communications circuitry 208 may be included in the apparatus 200. The communications circuitry 208 may include any means such as a device or circuitry embodied in either hardware or a combination of hardware and software that is configured to receive and/or transmit data from/to a network and/or any other device, circuitry, or module in communication with the apparatus 200. In some embodiments the communications circuitry 208 includes, for example, a network interface for enabling communications with a wired or wireless communications network. Additionally or alternatively, the communications circuitry 208 may include one or more network interface card(s), antenna(s), bus(es), switch(es), router(s), modem(s), and supporting hardware, firmware, and/or software, or any other device suitable for enabling communications via one or more communications network(s). In some embodiments, the communications circuitry 208 may include circuitry for interacting with an antenna(s) and/or other hardware or software to cause transmission of signals via the antenna(s) and/or to handle receipt of signals received via the antenna(s). In some embodiments, the communications circuitry 208 enables transmission to and/or receipt of data from a user device and/or other external computing device(s) in communication with the apparatus 200.

Data intake circuitry 212 may be included in the apparatus 200. The data intake circuitry 212 may include hardware, software, firmware, and/or a combination thereof, designed and/or configured to capture, receive, request, and/or otherwise gather data. In some embodiments, the data intake circuitry 212 includes hardware, software, firmware, and/or a combination thereof, that communicates with one or more components of the plurality of computing devices 110, the one or more user devices 160, and/or the one or more databases 150 to receive particular data. Additionally or alternatively, in some embodiments, the data intake circuitry

212 includes hardware, software, firmware, and/or a combination thereof, that retrieves particular data associated with plurality of computing devices 110, the one or more user devices 160, and/or the one or more databases 150 from one or more data repository/repositories accessible to the apparatus 200.

AI and machine learning circuitry 210 may be included in the apparatus 200. The AI and machine learning circuitry 210 may include hardware, software, firmware, and/or a combination thereof designed and/or configured to request, receive, process, generate, and transmit data, datasets, data structures, control signals, and electronic information for training and executing a trained AI and machine learning model configured to facilitating the operations and/or functionalities described herein. For example, in some embodiments the AI and machine learning circuitry 210 includes hardware, software, firmware, and/or a combination thereof, that identifies training data and/or utilizes such training data for training a particular machine learning model, AI, and/or other model to generate particular output data based at least in part on learnings from the training data. Additionally or alternatively, in some embodiments, the AI and machine learning circuitry 210 includes hardware, software, firmware, and/or a combination thereof, that embodies or retrieves a trained machine learning model, AI and/or other specially configured model utilized to process inputted data. Additionally or alternatively, in some embodiments, the AI and machine learning circuitry 210 includes hardware, software, firmware, and/or a combination thereof that processes received data utilizing one or more algorithm(s), function(s), subroutine(s), and/or the like, in one or more pre-processing and/or subsequent operations that need not utilize a machine learning or AI model.

Data output circuitry 214 may be included in the apparatus 200. The data output circuitry 214 may include hardware, software, firmware, and/or a combination thereof, that configures and/or generates an output based at least in part on data processed by the apparatus 200. In some embodiments, the data output circuitry 214 includes hardware, software, firmware, and/or a combination thereof, that generates a particular report based at least in part on the processed data, for example where the report is generated based at least in part on a particular reporting protocol. Additionally or alternatively, in some embodiments, the data output circuitry 214 includes hardware, software, firmware, and/or a combination thereof, that configures a particular output data object, output data file, and/or user interface for storing, transmitting, and/or displaying. For example, in some embodiments, the data output circuitry 214 generates and/or specially configures a particular data output for transmission to another system sub-system for further processing. Additionally or alternatively, in some embodiments, the data output circuitry 214 includes hardware, software, firmware, and/or a combination thereof, that causes rendering of a specially configured user interface based at least in part on data received by and/or processing by the apparatus 200.

In some embodiments, two or more of the sets of circuitries 202-214 are combinable. Alternatively, or additionally, one or more of the sets of circuitry 202-214 perform some or all of the operations and/or functionality described herein as being associated with another circuitry. In some embodiments, two or more of the sets of circuitry 202-214 are combined into a single module embodied in hardware, software, firmware, and/or a combination thereof. For example, in some embodiments, one or more of the sets of circuitry, for example the AI and machine learning circuitry 210, may be combined with the processor 202, such that the processor 202 performs one or more of the operations described herein with respect the AI and machine learning circuitry 210.

With reference to FIGS. 1-4, in some embodiments, the searching optimization system 140 may be configured to receive one or more datasets from a user. In some embodiments, the user may be associated with at least one of the plurality of computing devices 110. In this regard, for example, the plurality of computing devices 110 may be configured to transmit the one or more datasets to the searching optimization system 140. In some embodiments, the one or more datasets may comprise one or more documents. For example, if the computing device of the plurality of computing devices 110 associated with the user comprises a document management system, the one or more datasets may include documents associated with the document management system, such as design control documents, complaint forms, and/or the like.

Figure 3:
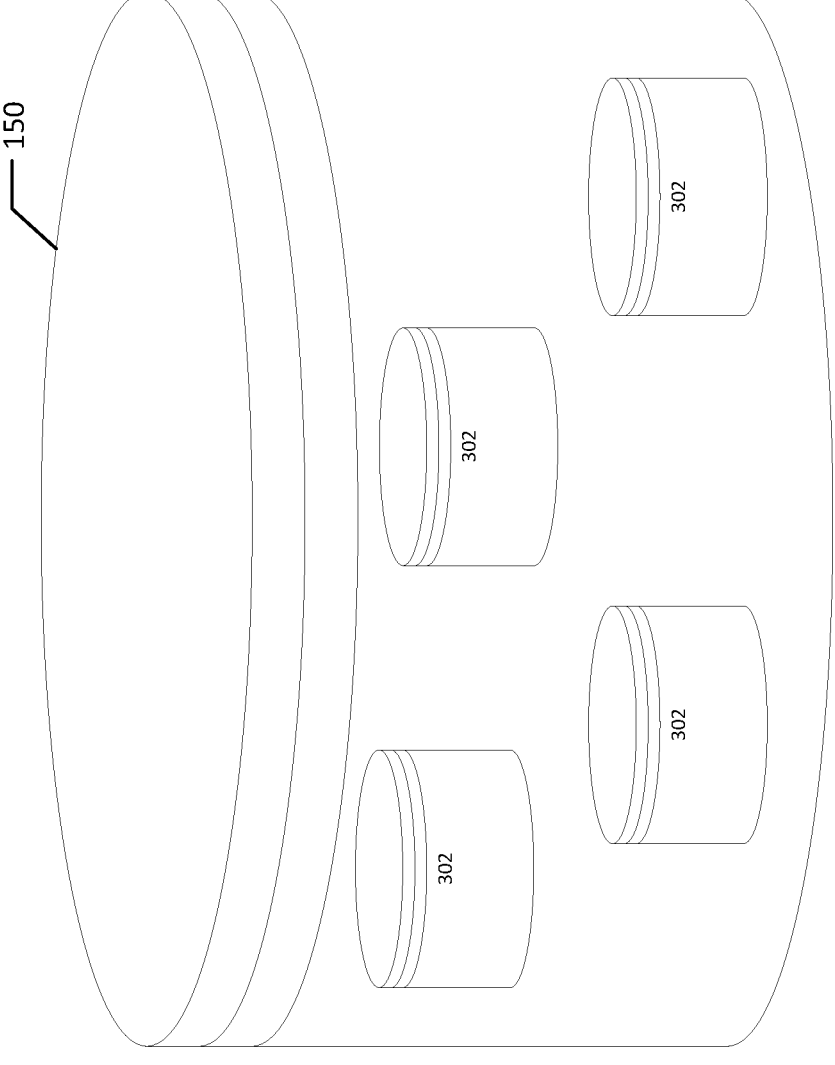
FIG. 3 illustrates an example of one or more databases having a plurality of shards in accordance with one or more embodiments of the present disclosure.
Figure 4:
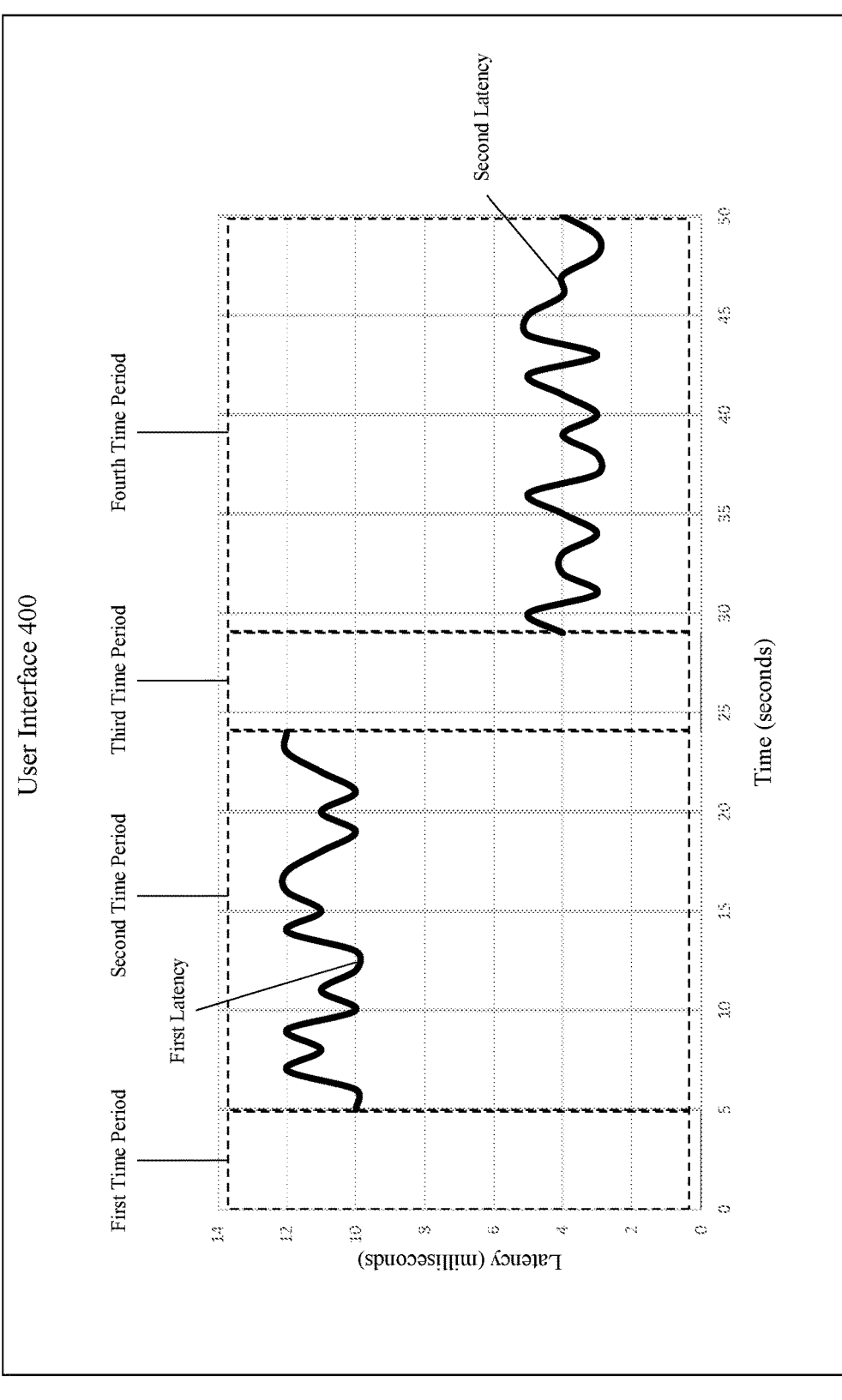
FIG. 4 illustrates an example user interface associated with a searching optimization system in accordance with one or more embodiments of the present disclosure.

In some embodiments, the searching optimization system 140 may be configured to store at least a portion of the one or more datasets in a first shard of a plurality of shards 302. In this regard, for example, the first shard of the plurality of shards 302 may be a shard associated with the one or more databases 150 (e.g., the one or more databases 150 are sharded databases). For example, as illustrated in FIG. 3, the first shard of the plurality of shards 302 may be one of four shards in the plurality of shards 302 in the one or more databases 150. Although depicted in FIG. 3 as the one or more databases 150 having four shards in the plurality of shards 302, it would be understood to one skilled in the field to which this disclosure pertains that the one or more databases 150 may have a plurality of shards 302 with more than four shards and/or less than four shards. For example, the plurality of shards 302 may include three shards or five shards. In some embodiments, the searching optimization system 140 may be configured to store at least a portion of the one or more datasets in the first shard during a first time period.

In some embodiments, the first shard of the plurality of shards 302 may include shard data. In some embodiments, the shard data may include at least a portion of the one or more datasets (e.g., once at least a portion of the one or more datasets has been stored in the first shard). For example, the shard data may include all of the one or more datasets (e.g., the entirety of the one or more datasets are stored in the first shard of the plurality of shards 302). As another example, the shard data may only include a portion of the one or more datasets. In this regard, for example, the searching optimization system 140 may be configured to store a first portion of the one or more datasets in a first shard of the plurality of shards 302 and a second portion of the one or more datasets in a second shard of the plurality of shards 302 (e.g., the searching optimization system 140 is configured to shard the one or more datasets). In some embodiments, the shard data may include at least a portion of the one or more datasets and other datasets. For example, the shard data may include at least a portion of the one or more datasets received from the user and other datasets received from the user and/or other users. In some embodiments, the shard data may be associated with a data size. In this regard, for example, the data size may indicate the size of the shard data. For example, the data size may be twenty gigabytes.

In some embodiments, the searching optimization system 140 may be configured to determine that the data size of the shard data in the first shard is greater than a first data size threshold. In some embodiments, the first data size threshold may be set by the searching optimization system 140. For example, the searching optimization system 140 may set the first data size threshold as twenty five gigabytes. In this regard, for example, the searching optimization system 140 may determine that the data size of the shard data is greater than the first data size threshold when the data size is greater than twenty five gigabytes.

In some embodiments, the first shard of the plurality of shards 302 may be associated with a first data storage size. In some embodiments, the first data storage size may indicate a maximum amount of data the first shard may store. In some embodiments, the first data storage size may be greater than the first data size threshold. For example, the first data storage size may be 50 gigabytes and the first data size threshold may be twenty five gigabytes.

In some embodiments, in response to the determination that the data size of the shard data in the first shard is greater than the first data size threshold, the searching optimization system 140 may be configured to transfer at least a portion of the shard data in the first shard to a second shard in the plurality of shards 302. For example, if the first data size threshold is twenty five gigabytes and the searching optimization system 140 determines that the data size of the shard data in the first shard is greater than twenty five gigabytes, the searching optimization system 140 may transfer at least a portion of the shard data in the first shard to a second shard in the plurality of shards 302. In some embodiments, the searching optimization system 140 may transfer enough of the shard data in the first shard to the second shard such that the data size of the shard data in the first shard is equal to or less than the first data size threshold. For example, if the first data size threshold is twenty five gigabytes and the data size of the shard data is thirty gigabytes, the searching optimization system 140 may transfer at least five gigabytes of the shard data in the first shard to the second shard. Additionally or alternatively, the searching optimization system 140 may transfer enough of the shard data in the first shard to the second shard such that the data size of the shard data in the first shard and a data size of shard data in the second shard may be approximately equal after the transfer. For example, if, before the transfer, the data size of the shard data in the first shard is thirty gigabytes and the data size of the shard data in the second shard is ten gigabytes, the searching optimization system 140 may transfer ten gigabytes of the shard data in the first shard to the second shard such that after the transfer the data size of the shard data in the first shard is twenty gigabytes and the data size of the shard data in the second shard is twenty gigabytes.

In some embodiments, transferring at least a portion of the shard data in the first shard to the second shard of the plurality of shards 302 may occur during a third time period. In some embodiments, the third time period may occur after the first time period. That is, transferring at least a portion of the shard data in the first shard to the second shard may occur after at least a portion of the one or more datasets have been stored in the first shard.

In some embodiments, the third time period is based at least in part on historical activity data associated with the user. In some embodiments, the historical activity data may indicate that a user is inactive during the third time period. Said differently, the searching optimization system 140 may be configured to collect activity data indicating time periods when the user is active and inactive and, based on an analysis of historical activity data (e.g., previously collected activity data), the searching optimization system 140 may be configured to determine that the user will be inactive during the third time period. In this regard, the searching optimization system 140 may be configured to transfer at least a portion of the shard data in the first shard to the second shard without causing any interruption to the user (e.g., the user is not impacted by the transferring). In some embodiments, the searching optimization system 140 may be configured to analyze the historical activity data to determine that a user is inactive during the third time period using one or more of a statistical model, an algorithmic model, and/or a machine learning model (e.g., using AI and machine learning circuitry 210).

In some embodiments, the third time period may be based at least in part on user specified activity data. In some embodiments, the user specified activity data may indicate a time period (e.g., the third time period) in which the user has indicated that the searching optimization system 140 should transfer at least a portion of the shard data in the first shard to the second shard. In this regard, for example, the user specified activity data indicates a time period in which the user has indicated that the user will be inactive. For example, if the user specified activity data indicates that the third time period should be on a Saturday from 1 am to 2 am, the searching optimization system 140 will transfer at least a portion of the shard data in the first shard to the second shard on a Saturday from 1 am to 2 am.

In some embodiments, the third time period may be based at least in part on user location data. In some embodiments, the user location data may indicate a location associated with the user (e.g., a location associated with a computing device of the plurality of computing devices 110). In this regard, for example, the searching optimization system 140 may use the user location data to determine a time period (e.g., the third time period) when a user is inactive (e.g., the user location data is used to determine when it is nighttime and/or the weekend at a user's location). In this regard, for example, the searching optimization system 140 may be configured to transfer at least a portion of the shard data in the first shard to the second shard when the user location data indicates that a user is inactive. For example, if user location data associated with a user indicates that a user is located in the Eastern Time Zone, the searching optimization system 140 may be configured to transfer at least a portion of the shard data in the first shard to the second shard when it is nighttime and/or when it is the weekend in the Eastern Time Zone.

In some embodiments, the first shard of the plurality of shards 302 may be associated with a first database of the one or more databases 150 and the second shard of the plurality of shards 302 may be associated with the first database of the one or more databases 150. In some embodiments, the first shard of the plurality of shards 302 may be associated with the first database of the one or more databases 150 and the second shard of the plurality of shards 302 may be associated with a second database of the one or more databases 150. That is, in some embodiments, the first shard and the second shard may each be associated with the same database in the one or more databases 150 while, in other embodiments, the first shard and the second shard may each be associated with a different database in the one or more databases 150.

In some embodiments, the searching optimization system 140 may be configured to receive a first query from the user to access at least a portion of the shard data. For example, the first query may be a search by the user of the shard data (e.g., a text search). In some embodiments, the searching optimization system 140 may be configured to receive the first query during a second time period. In some embodiments, the second time period may occur after the first time period (e.g., after the one or more datasets have been stored in the first shard). In some embodiments, the second time period may occur before the third time period (e.g., before the searching optimization system 140 has transferred at least a portion of the shard data in the first shard to the second shard of the plurality of shards 302).

In some embodiments, the searching optimization system 140 may be configured to receive a second query from the user to access at least a portion of the shard data. For example, the second query may be a search by the user of the shard data (e.g., a text search). In some embodiments, the searching optimization system 140 may be configured to receive the second query during a fourth time period. In some embodiments, the fourth time period may occur after the third time period (e.g., after the searching optimization system 140 has transferred at least a portion of the shard data in the first shard to the second shard of the plurality of shards 302).

In some embodiments, the searching optimization system 140 may be configured to return search results in response to the first query. For example, the search results may be a portion of the shard data (e.g., a portion of the shard data that is relevant to the first query). In some embodiments, the first query may be associated with a first latency. In this regard, the first latency may be an amount of time that it takes for the searching optimization system 140 to return the search results in response to the first query. For example, it may take the searching optimization system 140 ten milliseconds to return the search results in response to the first query.

In some embodiments, the searching optimization system 140 may be configured to return search results in response to the second query. For example, the search results may be a portion of the shard data (e.g., a portion of the shard data that is relevant to the second query). In some embodiments, the second query may be associated with a second latency. In this regard, the second latency may be an amount of time that it takes for the searching optimization system 140 to return the search results in response to the second query. For example, it may take the searching optimization system 140 four milliseconds to return the search results in response to the second query.

In some embodiments, the first latency may be greater than the second latency. That is, it may take the searching optimization system 140 longer to return the search results in response to the first query than it does to return the search results in response to the second query. For example, the first latency may be ten milliseconds and the second latency may be four milliseconds. In this regard, for example, the first latency may be greater than the second latency because the greater the data size of shard data in the first shard, the greater amount of time it may take to return the search results in response to the first query. Additionally or alternatively, the first latency may be greater than the second latency because the closer the data size of shard data in the first shard is to the first data storage size, the greater amount of time it may take to return the search results in response to the first query.

In some embodiments, the searching optimization system 140 may be configured to cause a user interface 400 to be displayed. In some embodiments, the user interface 400 may be configured to display a plurality of latencies associated with a plurality of queries during the second and fourth time period. In this regard, the user interface 400 may be configured to display a plurality of latencies associated with a plurality of queries during the second time period. For example, the user interface 400 may be configured to display the first latency (e.g., ten milliseconds). Additionally or alternatively, the user interface 400 may be configured to display a plurality of latencies associated with a plurality of queries during the fourth time period. For example, the user interface 400 may be configured to display the second latency (e.g., four milliseconds). In this regard, the user interface 400 may enable a user of the searching optimization system 140 to monitor latencies associated with queries before and after the searching optimization system 140 has transferred at least a portion of the shard data in the first shard to the second shard in the plurality of shards 302.

In some embodiments, the user interface 400 may be configured to display the first time period and the third time period. In some embodiments, the first time period and/or the third time period displayed on the user interface 400 may not include any latencies associated with queries (e.g., because the searching optimization does not receive and/or process any queries when storing the one or more datasets in the first shard and/or when transferring at least a portion of the shard data from the first shard to the second shard). In this regard, the user interface 400 may enable a user of the searching optimization system 140 to monitor the amount of time it takes for the searching optimization system 140 to store at least a portion of the one or more datasets in the first shard and/or the amount of time it takes for the searching optimization system 140 to transfer at least a portion of the shard data in the first shard to the second shard.

In some embodiments, the searching optimization system 140 may be configured to determine that a second data size of second shard data in a third shard of the plurality of shards 302 is less than a second data size threshold. In some embodiments, the second data size threshold may be set by the searching optimization system 140. For example, the searching optimization system 140 may set the second data size threshold as five gigabytes. In this regard, for example, the searching optimization system 140 may be configured to determine that the second data size of the second shard data is less than the second data size threshold when the second data size is less than five gigabytes.

In some embodiments, in response to the determination that the second data size of the second shard data in the third shard is less than the second data size threshold, the searching optimization system 140 may be configured to transfer at least a portion of the second shard data in the third shard to a fourth shard in the plurality of shards 302. For example, if the second data size threshold is five gigabytes and the searching optimization system 140 determines that the second data size the second shard data in the third shard is less than five gigabytes, the searching optimization system 140 may transfer at least a portion of the second shard data in the third shard to a fourth shard in the plurality of shards 302. In some embodiments, the searching optimization system 140 may transfer all of the second shard data in the third shard to the fourth shard. For example, if the second data size threshold is five gigabytes and the second data size of the second shard data is four gigabytes, the searching optimization system 140 may transfer all four gigabytes of the second shard data in the third shard to the fourth shard. In this regard, for example, the searching optimization system 140 may be configured to efficiently utilize the plurality of shards 302 in a cost effective manner. Said differently, if the searching optimization system 140 determines that a shard in the plurality of shards 302 (e.g., the third shard) is only using a portion of the storage size of a shard (e.g., the second data size of the second shard data in the third shard is less than the second data size threshold), the searching optimization system 140 may transfer shard data to another shard in the plurality of shards 302 that has free storage space. In this way, the searching optimization system 140 may be configured to consolidate shard data from shards that are each only storing a minimal amount of shard data (e.g., shards having shard data with a data size less than the second data size threshold) into a fewer number of shards, enabling the searching optimization system 140 to reduce costs (e.g., less shards have to be maintained).

Example Methods

Figure 5:
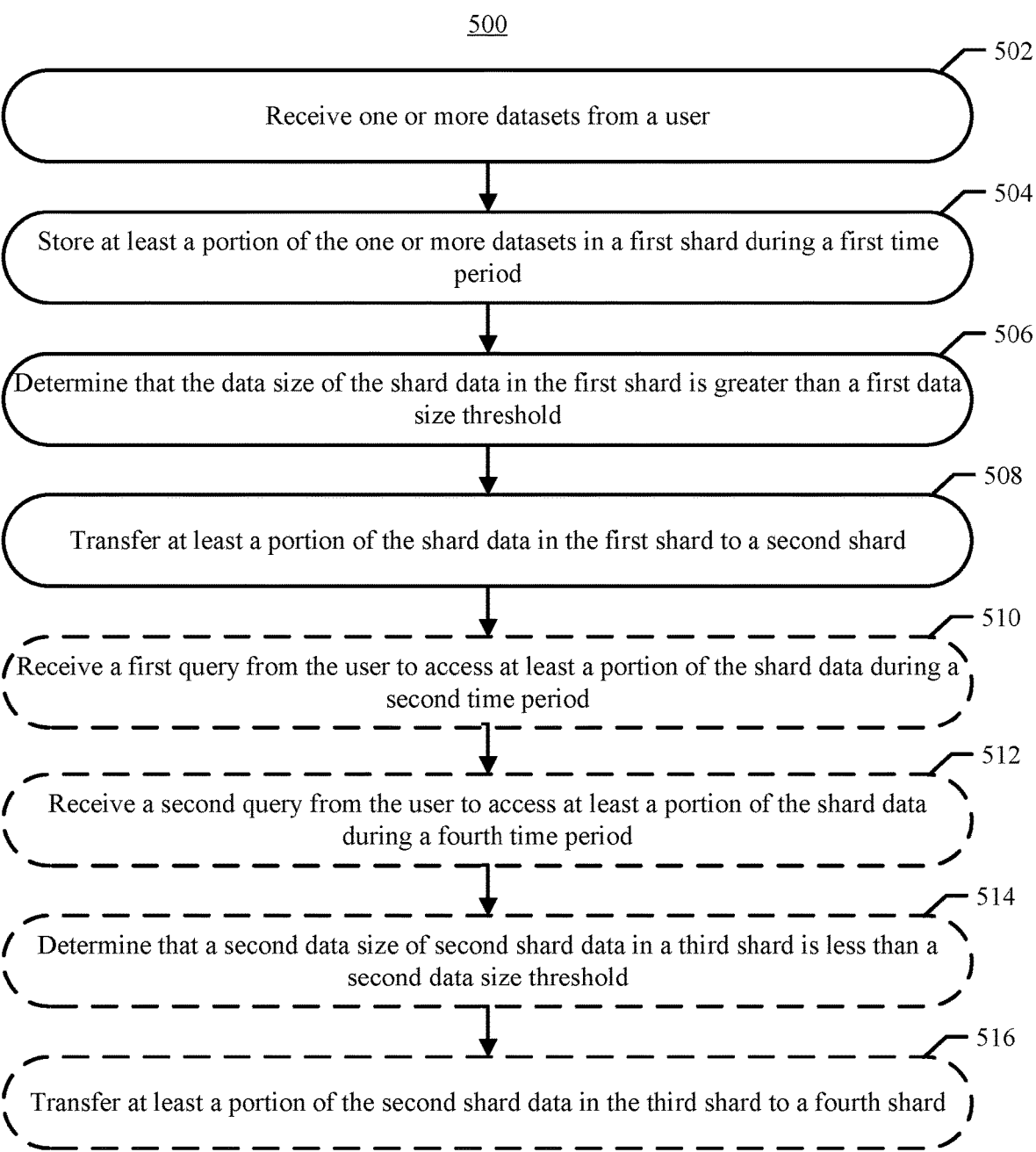
FIG. 5 illustrates a flow chart of an example computer-implemented method in accordance with one or more embodiments of the present disclosure.

Referring now to FIG. 5, a flowchart providing an example computer-implemented method 500 is illustrated. In this regard, FIG. 5 illustrates operations that may be performed by the searching optimization system 140 and/or components of the searching optimization system 140.

As shown in block 502, the computer-implemented method 500 may include receiving one or more datasets from a user. As described above, in some embodiments, the user may be associated with at least one of the plurality of computing devices. In this regard, for example, the plurality of computing devices may be configured to transmit the one or more datasets. In some embodiments, the one or more datasets may comprise one or more documents. For example, if the computing device of the plurality of computing devices associated with the user comprises a document management system, the one or more datasets may include documents associated with the document management system, such as design control documents, complaint forms, and/or the like.

As shown in block 504, the computer-implemented method 500 may include storing at least a portion of the one or more datasets in a first shard during a first time period. As described above, in some embodiments, the first shard may be one of a plurality of shards. In this regard, for example, the first shard of the plurality of shards may be a shard associated with the one or more databases (e.g., the one or more databases are sharded databases). For example, the first shard of the plurality of shards may be one of four shards in the plurality of shards in the one or more databases.

In some embodiments, the first shard of the plurality of shards may include shard data. In some embodiments, the shard data may include at least a portion of the one or more datasets (e.g., once at least a portion of the one or more datasets has been stored in the first shard). For example, the shard data may include all of the one or more datasets (e.g., the entirety of the one or more datasets are stored in the first shard of the plurality of shards). As another example, the shard data may only include a portion of the one or more datasets. In this regard, a first portion of the one or more datasets may be stored in a first shard of the plurality of shards and a second portion of the one or more datasets may be stored in a second shard of the plurality of shards (e.g., the one or more datasets may be sharded). In some embodiments, the shard data may include at least a portion of the one or more datasets and other datasets. For example, the shard data may include at least a portion of the one or more datasets received from the user and other datasets received from the user and/or other users. In some embodiments, the shard data may be associated with a data size. In this regard, for example, the data size may indicate the size of the shard data. For example, the data size may be twenty gigabytes.

As shown in block 506, the computer-implemented method 500 may include determining that the data size of the shard data in the first shard is greater than a first data size threshold. As described above, in some embodiments, it may be determined that the data size of the shard data in the first shard is greater than a first data size threshold. In some embodiments, the first data size threshold may be set. For example, the first data size threshold may be set as twenty five gigabytes. In this regard, for example, it may be determined that the data size of the shard data is greater than the first data size threshold when the data size is greater than twenty five gigabytes.

In some embodiments, the first shard of the plurality of shards may be associated with a first data storage size. In some embodiments, the first data storage size may indicate a maximum amount of data the first shard may store. In some embodiments, the first data storage size may be greater than the first data size threshold. For example, the first data storage size may be 50 gigabytes and the first data size threshold may be twenty five gigabytes.

As shown in block 508, the computer-implemented method 500 may include, in response to the determination that the data size of the shard data in the first shard is greater than the first data size threshold, transferring at least a portion of the shard data in the first shard to a second shard. As described above, for example, if the first data size threshold is twenty five gigabytes and it is determined that the data size of the shard data in the first shard is greater than twenty five gigabytes, at least a portion of the shard data in the first shard may be transferred to a second shard in the plurality of shards. In some embodiments, enough of the shard data in the first shard may be transferred to the second shard such that the data size of the shard data in the first shard is equal to or less than the first data size threshold. For example, if the first data size threshold is twenty five gigabytes and the data size of the shard data is thirty gigabytes, at least five gigabytes of the shard data in the first shard may be transferred to the second shard. Additionally or alternatively, enough of the shard data in the first shard may be transferred to the second shard such that the data size of the shard data in the first shard and a data size of shard data in the second shard may be approximately equal after the transfer. For example, if, before the transfer, the data size of the shard data in the first shard is thirty gigabytes and the data size of the shard data in the second shard is ten gigabytes, ten gigabytes of the shard data in the first shard may be transferred to the second shard such that after the transfer the data size of the shard data in the first shard is twenty gigabytes and the data size of the shard data in the second shard is twenty gigabytes.

In some embodiments, transferring at least a portion of the shard data in the first shard to the second shard of the plurality of shards may occur during a third time period. In some embodiments, the third time period may occur after the first time period. That is, transferring at least a portion of the shard data in the first shard to the second shard may occur after at least a portion of the one or more datasets have been stored in the first shard.

In some embodiments, the third time period is based at least in part on historical activity data associated with the user. In some embodiments, the historical activity data may indicate that a user is inactive during the third time period. Said differently, activity data indicating time periods when the user is active and inactive may be collected and, based on an analysis of historical activity data (e.g., previously collected activity data), it may be determined that the user will be inactive during the third time period. In this regard, at least a portion of the shard data in the first shard may be transferred to the second shard without causing any interruption to the user (e.g., the user is not impacted by the transferring). In some embodiments, the historical activity data may be analyzed to determine that a user is inactive during the third time period using one or more of a statistical model, an algorithmic model, and/or a machine learning model (e.g., using AI and machine learning circuitry).

In some embodiments, the third time period may be based at least in part on user specified activity data. In some embodiments, the user specified activity data may indicate a time period (e.g., the third time period) in which the user has indicated that at least a portion of the shard data in the first shard should be transferred to the second shard. In this regard, for example, the user specified activity data indicates a time period in which the user has indicated that the user will be inactive. For example, if the user specified activity data indicates that the third time period should be on a Saturday from 1 am to 2 am, at least a portion of the shard data in the first shard to the second shard may be transferred on a Saturday from 1 am to 2 am.

In some embodiments, the third time period may be based at least in part on user location data. In some embodiments, the user location data may indicate a location associated with the user (e.g., a location associated with a computing device of the plurality of computing devices). In this regard, for example, the user location data may be used to determine a time period (e.g., the third time period) when a user is inactive (e.g., the user location data is used to determine when it is nighttime and/or the weekend at a user's location). In this regard, for example, at least a portion of the shard data in the first shard may be transferred to the second shard when the user location data indicates that a user is inactive. For example, if a user's user location data indicates that a user is located in the Eastern Time Zone, at least a portion of the shard data in the first shard may be transferred to the second shard when it is nighttime and/or when it is the weekend in the Eastern Time Zone.

In some embodiments, the first shard of the plurality of shards may be associated with a first database of the one or more databases and the second shard of the plurality of shards may be associated with the first database of the one or more databases. In some embodiments, the first shard of the plurality of shards may be associated with the first database of the one or more databases and the second shard of the plurality of shards may be associated with a second database of the one or more databases. That is, in some embodiments, the first shard and the second shard may each be associated with the same database in the one or more databases while, in other embodiments, the first shard and the second shard may each be associated with a different database in the one or more databases.

As shown in block 510, the computer-implemented method 500 may optionally include receiving a first query from the user to access at least a portion of the shard data during a second time period. As described above, for example, the first query may be a search by the user of the shard data (e.g., a text search). In some embodiments, the first query may be received during a second time period. In some embodiments, the second time period may occur after the first time period (e.g., after the one or more datasets have been stored in the first shard). In some embodiments, the second time period may occur before the third time period.

As shown in block 512, the computer-implemented method 500 may optionally include receiving a second query from the user to access at least a portion of the shard data during a fourth time period. As described above, for example, the second query may be a search by the user of the shard data (e.g., a text search). In some embodiments, the second query may be received during a fourth time period. In some embodiments, the fourth time period may occur after the third time period.

In some embodiments, search results may be returned in response to the first query. For example, the search results may be a portion of the shard data (e.g., a portion of the shard data that is relevant to the first query). In some embodiments, the first query may be associated with a first latency. In this regard, the first latency may be an amount of time that it takes for the search results to be returned in response to the first query. For example, it may take ten milliseconds to return the search results in response to the first query.

In some embodiments, search results may be returned in response to the second query. For example, the search results may be a portion of the shard data (e.g., a portion of the shard data that is relevant to the second query). In some embodiments, the second query may be associated with a second latency. In this regard, the second latency may be an amount of time that it takes for the search results to be returned in response to the second query. For example, it may take four milliseconds to return the search results in response to the second query.

In some embodiments, the first latency may be greater than the second latency. That is, it may take longer to return the search results in response to the first query than it does to return the search results in response to the second query. For example, the first latency may be ten milliseconds and the second latency may be four milliseconds. In this regard, for example, the first latency may be greater than the second latency because the greater the data size of shard data in the first shard, the greater amount of time it may take to return the search results in response to the first query. Additionally or alternatively, the first latency may be greater than the second latency because the closer the data size of shard data in the first shard is to the first data storage size, the greater amount of time it may take to return the search results in response to the first query.

In some embodiments, a user interface may be displayed. In some embodiments, the user interface may be configured to display a plurality of latencies associated with a plurality of queries during the second and fourth time period. In this regard, the user interface may be configured to display a plurality of latencies associated with a plurality of queries during the second time period. For example, the user interface may be configured to display the first latency (e.g., ten milliseconds). Additionally or alternatively, the user interface may be configured to display a plurality of latencies associated with a plurality of queries during the fourth time period. For example, the user interface may be configured to display the second latency (e.g., four milliseconds). In this regard, the user interface may enable a user to monitor latencies associated with queries before and after at least a portion of the shard data in the first shard has been transferred to the second shard in the plurality of shards.

As shown in block 514, the computer-implemented method 500 may optionally include determining that a second data size of second shard data in a third shard is less than a second data size threshold. As described above, in some embodiments, the second data size threshold may be set. For example, the second data size threshold may be set as five gigabytes. In this regard, for example, it may be determined that the second data size of the second shard data is less than the second data size threshold when the second data size is less than five gigabytes.

As shown in block 516, the computer-implemented method 500 may optionally include, in response to the determination that the second data size of the second shard data in the third shard is less than the second data size threshold, transferring at least a portion of the second shard data in the third shard to a fourth shard. As described above, for example, if the second data size threshold is five gigabytes it is determined that the second data size the second shard data in the third shard is less than five gigabytes, at least a portion of the second shard data in the third shard may be transferred to a fourth shard in the plurality of shards. In some embodiments, all of the second shard data in the third shard may be transferred to the fourth shard. For example, if the second data size threshold is five gigabytes and the second data size of the second shard data is four gigabytes, all four gigabytes of the second shard data in the third shard may be transferred to the fourth shard. In this regard, for example, the plurality of shards may be efficiently utilized in a cost effective manner. Said differently, if it is determined that a shard in the plurality of shards (e.g., the third shard) is only using a portion of the storage size of a shard (e.g., the second data size of the second shard data in the third shard is less than the second data size threshold), shard data may be transferred to another shard in the plurality of shards that has free storage space. In this way, shard data may be consolidated from shards that are each only storing a minimal amount of shard data (e.g., shards having shard data with a data size less than the second data size threshold) into a fewer number of shards, enabling cost reduction (e.g., less shards have to be maintained).

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

That which is claimed:

1. A computer-implemented method comprising:

receiving one or more datasets from a user;

storing at least a portion of the one or more datasets in a first shard during a first time period, wherein the first shard comprises shard data, wherein the shard data is associated with a data size;

determining that the data size of the shard data in the first shard is greater than a first data size threshold based on a first latency involved in responding to a first query to access the first shard during a second time period; and in response to the determination that the data size of the shard data in the first shard is greater than the first data size threshold, transferring at least a portion of the shard data in the first shard to a second shard based at least on a location of the user identified as inactive, wherein the first data size threshold, which is based on a first latency, is adjusted based on analysis of historical activity data and query latency associated with the user.

2. The computer-implemented method of claim 1, wherein transferring at least a portion of the shard data in the first shard to the second shard occurs during a third time period.

3. The computer-implemented method of claim 2, wherein the third time period is based at least in part on the historical activity data associated with the user.

4. The computer-implemented method of claim 3, wherein the historical activity data indicates that the user is inactive during the third time period.

5. The computer-implemented method of claim 2, further comprising:

receiving the first query from the user to access at least a portion of the shard data during the second time period before transferring at least the portion of the shard, wherein the first query is associated with the first latency; and receiving a second query from the user to access at least a portion of the shard data during a fourth time period after transferring at least a portion of the shard data in the first shard to the second shard, wherein the second query is associated with a second latency.

6. The computer-implemented method of claim 5, wherein the first latency is greater than the second latency.

7. The computer-implemented method of claim 1, wherein the shard data comprises at least a portion of the one or more datasets.

8. The computer-implemented method of claim 1, wherein the first shard is associated with a first database and the second shard is associated with a second database.

9. The computer-implemented method of claim 1, wherein the first shard has a first data storage size, wherein the first data storage size is greater than the first data size threshold.

10. The computer-implemented method of claim 1, further comprising:

determining that a second data size of second shard data in a third shard is less than a second data size threshold; and in response to the determination that the second data size of the second shard data in the third shard is less than the second data size threshold, transferring at least a portion of the second shard data in the third shard to a fourth shard.

11. An apparatus comprising at least one processor and at least one memory coupled to the at least one processor, wherein the at least one processor is configured to:

receive one or more datasets from a user;

store at least a portion of the one or more datasets in a first shard during a first time period, wherein the first shard comprises shard data, wherein the shard data is associated with a data size;

determine that the data size of the shard data in the first shard is greater than a first data size threshold based on a first latency involved in responding to a first query to access the first shard during a second time period; and in response to the determination that the data size of the shard data in the first shard is greater than the first data size threshold, transfer at least a portion of the shard data in the first shard to a second shard based at least on a location of the user identified as inactive, wherein the first data size threshold, which is based on a first latency, is adjusted based on analysis of historical activity data and query latency associated with the user.

12. The apparatus of claim 11, wherein transferring at least a portion of the shard data in the first shard to the second shard occurs during a third time period.

13. The apparatus of claim 12, wherein the third time period is based at least in part on the historical activity data associated with the user.

14. The apparatus of claim 13, wherein the historical activity data indicates that the user is inactive during the third time period.

15. The apparatus of claim 12, wherein the at least one processor is configured to:

receive the first query from the user to access at least a portion of the shard data during the second time period before transferring at least the portion of the shard data, wherein the first query is associated with the first latency; and receive a second query from the user to access at least a portion of the shard data during a fourth time period after transferring at least a portion of the shard data in the first shard to the second shard, wherein the second query is associated with a second latency.

16. The apparatus of claim 15, wherein the first latency is greater than the second latency.

17. The apparatus of claim 11, wherein the first shard is associated with a first database and the second shard is associated with a second database.

18. The apparatus of claim 11, wherein the first shard has a first data storage size, wherein the first data storage size is greater than the first data size threshold.

19. The apparatus of claim 11, wherein the at least one processor is configured to:

determine that a second data size of second shard data in a third shard is less than a second data size threshold; and in response to the determination that the second data size of the second shard data in the third shard is less than the second data size threshold, transfer at least a portion of the second shard data in the third shard to a fourth shard.

20. A non-transitory computer-readable storage medium comprising computer program code for execution by one or more processors of a device, the computer program code configured to, when executed by the one or more processors, cause the device to:

receive one or more datasets from a user;

store at least a portion of the one or more datasets in a first shard during a first time period, wherein the first shard comprises shard data, wherein the shard data is associated with a data size;

determine that the data size of the shard data in the first shard is greater than a first data size threshold based on a first latency involved in responding to a first query to access the first shard during a second time period; and in response to the determination that the data size of the shard data in the first shard is greater than the first data size threshold, transfer at least a portion of the shard data in the first shard to a second shard based at least on a location of the user identified as inactive, wherein the first data size threshold, which is based on a first latency, is adjusted based on analysis of historical activity data and query latency associated with the user.

\* \* \* \* \*